United States Patent
Nandi et al.

(10) Patent No.: US 10,961,377 B2
(45) Date of Patent: Mar. 30, 2021

(54) PROCESS FOR THE PRODUCTION OF AN ETHYLENE-PROPYLENE-DIENE TERPOLYMER (EPDM) COMPOSITION

(71) Applicant: SABIC GLOBAL TECHNOLOGIES B.V., Bergen op Zoom (NL)

(72) Inventors: Sangita Nandi, Geleen (NL); Rukmini Khatokar, Geleen (NL); Anirban Ganguly, Geleen (NL); Debasish Banerjee, Geleen (NL); Susanta Mitra, Geleen (NL); Stephen D. Pask, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/617,232

(22) PCT Filed: May 25, 2018

(86) PCT No.: PCT/EP2018/063801
§ 371 (c)(1),
(2) Date: Nov. 26, 2019

(87) PCT Pub. No.: WO2018/219815
PCT Pub. Date: Dec. 6, 2018

(65) Prior Publication Data
US 2020/0148870 A1 May 14, 2020

(30) Foreign Application Priority Data
Jun. 1, 2017 (EP) ..................................... 17173937

(51) Int. Cl.
*C08L 23/16* (2006.01)

(52) U.S. Cl.
CPC ........... *C08L 23/16* (2013.01); *C08L 2205/05* (2013.01); *C08L 2207/07* (2013.01)

(58) Field of Classification Search
None
See application file for complete search history.

(56) References Cited

U.S. PATENT DOCUMENTS

| | | | | |
|---|---|---|---|---|
| 3,794,696 A * | 2/1974 | Lal | ........................... | C08K 3/22 525/211 |
| 2016/0200881 A1 | 7/2016 | Matsumura et al. | | |
| 2018/0218805 A1* | 8/2018 | Ranganathan | ........... | C08K 3/34 |

FOREIGN PATENT DOCUMENTS

| | | |
|---|---|---|
| EP | 0338860 A2 | 10/1989 |
| EP | 1338619 A1 | 8/2003 |
| WO | 2005028555 A1 | 3/2005 |

OTHER PUBLICATIONS

De Pooter et al.; "Determination of the Composition of Common Linear Low Density Polyethylene Copolymers by C-NMR Spectroscopy" Journal of Applied Polymer Science, vol. 42, 1991, pp. 399-408.
International Search Report; International Application No. PCT/EP2018/063801; International Filing Date: May 25, 2018; dated Aug. 16, 2018; 3 pages.
Written Opinion; International Application No. PCT/EP2018/063801; International Filing Date: May 25, 2018; dated Aug. 16, 2018; 5 pages. Mailing:.

* cited by examiner

*Primary Examiner* — Christopher M Rodd
(74) *Attorney, Agent, or Firm* — Cantor Colburn LLP

(57) ABSTRACT

The present invention relates to a process for the production of an ethylene-propylene-diene terpolymer (EPDM) composition in a reaction vessel comprising the following steps in this order: (a) supplying a quantity of a first composition comprising an ethylene copolymer or a propylene copolymer and a first peroxide to the reaction vessel; (b) supplying a quantity of a second composition comprising EPDM and a second peroxide to the reaction vessel; or (a) supplying a quantity of a second composition comprising EPDM and a second peroxide to the reaction vessel; (b) supplying a quantity of a first composition comprising an ethylene copolymer or a propylene copolymer and a first peroxide to the reaction vessel; and (c) exposing the contents of the reaction vessel under stirring to a temperature of 100-200° C.; wherein the ethylene copolymer is a copolymer comprising polymeric units derived from ethylene and polymeric units derived from a mono-olefinic compound comprising 3 to 10 carbon atoms, and wherein the propylene copolymer is a copolymer comprising polymeric units derived from propylene and polymeric units derived from a mono-olefinic compound comprising 2 carbon atoms or 4-10 carbon atoms. Such process allows for the production of an oil-extended EPDM composition having a certain high Mooney viscosity whilst still using an EPDM as obtained from the polymerisation process having a relatively moderate Mooney viscosity.

20 Claims, No Drawings

PROCESS FOR THE PRODUCTION OF AN ETHYLENE-PROPYLENE-DIENE TERPOLYMER (EPDM) COMPOSITION

CROSS REFERENCE TO RELATED APPLICATIONS

This application is a 371 of International Application No. PCT/EP2018/063801, filed May 25, 2018, which is incorporated by reference in its entirety, and which claims priority to European Application Serial No. 17173937.8, filed Jun. 1, 2017.

The present invention relates to a process for the production of an ethylene-propylene-diene terpolymer (EPDM) composition having an improved Mooney viscosity. The invention further relates to an ethylene-propylene-diene terpolymer (EPDM) composition obtained according to such process.

Ethylene-propylene-diene terpolymer (EPDM) rubbers are well-known elastomeric materials that find their use in applications including construction materials and automotive materials such as tires. EPDM provides a highly desired profile of properties, including excellent weather resistance, flexibility at low temperatures, good mechanical properties and electrical properties, high temperature resistance and good processability.

Ethylene-propylene-diene terpolymer (EPDM) compositions are commonly used in formulations comprising a large quantity of fillers. For example, such formulations may comprise up to 90 wt % of fillers. Common fillers are for example carbon black, clays, calcium carbonate, or silicas. In order for such formulations to be able to hold such large quantity of fillers, the EPDM composition can for example comprise a quantity of certain oils, such as paraffinic oils. This is known as oil-extension of the EPDM formulations. Such oil-extended EPDM formulations may be able to comprise 90 wt % of fillers whilst still being suitable for processing into the desired shape because of a suitable high flowability.

The processing of EPDM compositions into shaped objects commonly involves a curing step in which a certain part of the unsaturated carbon-carbon bonds that are present in the EPDM composition, notably in the pendant moieties derived from the diene comonomer, react to form cross-links. The EPDM composition prior to curing is thermoplastically processable, whereas upon curing the obtained material, then being an EPDM rubber, is no longer thermoplastically processable.

In order to be able to comprise such oils, the EPDM composition needs to have a certain high molecular weight, as expressed by the Mooney viscosity. However, to achieve such high Mooney viscosity, the EPDM needs to be subjected to a relatively long polymerisation time, which obviously has a negative impact on process economics. The Mooney viscosity of the oil-extended EPDM formulation is, by virtue of the oil incorporation into the formulation, reduced vis-a-vis the Mooney viscosity of the EPDM used to produce such formulation. For example, an oil-extended formulation prepared using an EPDM having a Mooney viscosity of 80 MU may itself have a Mooney viscosity that is significantly lower than 80 MU. Still, there is a desire to have access to EPDM having a high Mooney viscosity that would allow production of oil-extended formulations of also a certain high Mooney viscosity without having to achieve the high Mooney viscosity of the EPDM in the polymerisation reaction.

This has now been achieved according to the present invention by a process for the production of an ethylene-propylene-diene terpolymer (EPDM) composition in a reaction vessel comprising the following steps in this order:
  (a) supplying a quantity of a first composition comprising an ethylene copolymer or a propylene copolymer and a first peroxide to the reaction vessel;
  (b) supplying a quantity of a second composition comprising EPDM and a second peroxide to the reaction vessel; or
  (a) supplying a quantity of a second composition comprising EPDM and a second peroxide to the reaction vessel;
  (b) supplying a quantity of a first composition comprising an ethylene copolymer or a propylene copolymer and a first peroxide to the reaction vessel;
  and
  (c) exposing the contents of the reaction vessel under stirring to a temperature of 100-200° C.;
  wherein the ethylene copolymer is a copolymer comprising polymeric units derived from ethylene and polymeric units derived from a mono-olefinic compound comprising 3 to 10 carbon atoms, and wherein the propylene copolymer is a copolymer comprising polymeric units derived from propylene and polymeric units derived from a mono-olefinic compound comprising 2 carbon atoms or 4-10 carbon atoms.

Preferably, the process involves a step (a2) between step (a) and step (b) wherein the contents of the reaction vessel are heated to above the melting temperature.

Preferably, the ethylene copolymer is not an EPDM and the propylene copolymer is not an EPDM.

Alternatively, the temperature in step (c) may be in the range of 125-175° C.

Such process allows for the production of an oil-extended EPDM composition having a certain high Mooney viscosity whilst still using an EPDM as obtained from the polymerisation process having a relatively moderate Mooney viscosity. The process results in an EPDM composition having an increased Mooney viscosity compared to the Mooney viscosity of the EPDM that is supplied to the process. In the process of the invention, the peroxides ensure the EPDM to react with the ethylene copolymer or the propylene copolymer, as a result of which polymeric structures are formed having increased chain length, leading to an increased Mooney viscosity.

In a certain embodiment, the present invention relates to a process for the production of an ethylene-propylene-diene terpolymer (EPDM) composition in a reaction vessel comprising the following steps in this order:
  (a) supplying a quantity of a first composition comprising an ethylene copolymer or a propylene copolymer and a first peroxide to the reaction vessel;
  (b) supplying a quantity of a second composition comprising EPDM and a second peroxide to the reaction vessel; or
  (a) supplying a quantity of a second composition comprising EPDM and a second peroxide to the reaction vessel;
  (b) supplying a quantity of a first composition comprising an ethylene copolymer or a propylene copolymer and a first peroxide to the reaction vessel;
  and
  (c) exposing the contents of the reaction vessel under stirring to a temperature of 100-200° C.;
  wherein the ethylene copolymer is a copolymer comprising polymeric units derived from ethylene and polymeric units derived from a mono-olefinic compound comprising 3 to 10 carbon atoms, and wherein the propylene copolymer is a copolymer comprising polymeric units derived from propylene and polymeric units derived from a mono-olefinic compound comprising 2 carbon atoms or 4-10 carbon atoms;

wherein the process involves a step (a2) between step (a) and step (b) wherein the contents of the reaction vessel are heated to above the melting temperature; and wherein the ethylene copolymer is not an EPDM and the propylene copolymer is not an EPDM.

In the process according to the present invention, the exposure to the temperature during step (c) may for example be for a duration of >5 minutes, such as 5-30 minutes. In a particular embodiment, the contents of the reaction vessel in step (c) are exposed to a temperature of 125-175° C. for a period of 5-30 minutes.

The first composition may for example be supplied in a quantity of 5-50 wt % with regard to the total weight of the first composition and the second composition. More preferably, the first composition is supplied in a quantity of 5-40 wt %, even more preferably 5-20 wt %, with regard to the total weight of the first composition and the second composition.

The process in certain embodiments may comprise the following steps in this order:

(a) supplying a quantity of a first composition comprising an ethylene copolymer and a first peroxide to the reaction vessel and heating the contents of the reaction vessel to above the melting temperature of the ethylene copolymer;

(b) supplying a quantity of a second composition comprising EPDM and a second peroxide to a reaction vessel; and (c) exposing the contents of the reaction vessel to a temperature of 100-200° C.

In certain further embodiments, the process may comprise the following steps in this order:

(a) supplying a quantity of a first composition comprising an ethylene copolymer and a first peroxide to the reaction vessel and heating the contents of the reaction vessel to a temperature of >60° C.;

(b) supplying a quantity of a second composition comprising EPDM and a second peroxide to a reaction vessel; and (c) exposing the contents of the reaction vessel to a temperature of 100-200° C.

It is preferred that the pressure in the reaction vessel during the process is atmospheric pressure. Particularly, it is preferred that the pressure during step (c) is atmospheric pressure.

The EPDM as used in the process according to the present invention may for example comprise 40.0-80.0 wt % of polymeric units derived from ethylene. Preferably, the EPDM comprises 50.0-75.0 wt % of ethylene, more preferably 55.0-65.0 wt %. The presence of such quantity of polymeric units derived from ethylene in the EPDM may contribute to the desired Mooney viscosity of the composition obtained via the process of the present invention.

The EPDM may comprises 20.0-50.0 wt % of polymeric units derived from propylene. Preferably, the EPDM comprises 20.0-40.0 wt % of polymeric units derived from propylene, more preferably 25.0-40.0 wt %.

The EPDM may comprise 0.5-15.0 wt % of polymeric units derived from a diene monomer. Preferably, the EPDM comprises 0.5-10.0 wt % of polymeric units derived from a diene monomer, more preferably 2.0-8.0 wt %, even more preferably 4.0-6.0 wt %. The presence of such quantity of polymeric units derived from a diene monomer in the EPDM may contribute to both the desired Mooney viscosity of the composition obtained from the process as well as to presence of sufficient unsaturations to allow the required degree of cross-linking in the final product produced from the EPDM compositions obtained via the process of the present invention.

The diene monomer may for example be one or more selected from 1,4-hexadiene, 1,6-octadiene, 5-methyl-1,4-hexadiene, 3,7-dimethyl-1,6-octadiene, dicyclopentadiene (DCPD), 5-vinyl-2-norbornene, 5-ethylidene-2-norbonene (ENB), and/or 2,5-norbornadiene. For example, the diene monomer may for example be one selected from 1,4-hexadiene, 1,6-octadiene, 5-methyl-1,4-hexadiene, 3,7-dimethyl-1,6-octadiene, dicyclopentadiene (DCPD), 5-vinyl-2-norbornene, 5-ethylidene-2-norbonene (ENB), or 2,5-norbornadiene. For example, the diene monomer may be selected from dicyclopentadiene (DCPD), 5-vinyl-2-norbornene, or 5-ethylidene-2-norbonene (ENB). It is particularly preferred that the diene monomer is 5-ethylidene-2-norbonene (ENB).

The EPDM may for example comprise 0.5-15.0 wt % of polymeric units derived from one or more selected from 1,4-hexadiene, 1,6-octadiene, 5-methyl-1,4-hexadiene, 3,7-dimethyl-1,6-octadiene, dicyclopentadiene (DCPD), 5-vinyl-2-norbornene, 5-ethylidene-2-norbonene (ENB), and/or 2,5-norbornadiene. The EPDM may for example comprise 0.5-15.0 wt % of polymeric units derived from 1,4-hexadiene, 1,6-octadiene, 5-methyl-1,4-hexadiene, 3,7-dimethyl-1,6-octadiene, dicyclopentadiene (DCPD), 5-vinyl-2-norbornene, 5-ethylidene-2-norbonene (ENB), or 2,5-norbornadiene. More preferably, the EPDM comprises 0.5-10.0 wt %, even more preferably 2.0-8.0 wt %, even more preferably 4.0-6.0 wt % of polymeric units derived from 1,4-hexadiene, 1,6-octadiene, 5-methyl-1,4-hexadiene, 3,7-dimethyl-1,6-octadiene, dicyclopentadiene (DCPD), 5-vinyl-2-norbornene, 5-ethylidene-2-norbonene (ENB), or 2,5-norbornadiene. Even more preferably, the EPDM comprises 0.5-15.0 wt % of polymeric units derived from DCPD, ENB or VNB, even more preferably 2.0-8.0 wt %, or 4.0-6.0 wt %. In a particular embodiment, the EPDM comprises 0.5-15.0 wt % of polymeric units derived from ENB, more preferably 2.0-8.0 wt %, or 4.0-6.0 wt %.

In a particular embodiment, the EPDM comprises 0.5-15.0 wt %, preferably 2.0-8.0 wt %, more preferably 4.0-6.0 wt %, of polymeric units derived from a diene monomer, wherein the diene monomer is selected from 1,4-hexadiene, 1,6-octadiene, 5-methyl-1,4-hexadiene, 3,7-dimethyl-1,6-octadiene, dicyclopentadiene (DCPD), 5-vinyl-2-norbornene, 5-ethylidene-2-norbonene (ENB), or 2,5-norbornadiene. More preferably, the EPDM comprises 0.5-15.0 wt %, preferably 2.0-8.0 wt %, more preferably 4.0-6.0 wt %, of polymeric units derived from a diene monomer, wherein the diene monomer is selected from dicyclopentadiene (DCPD), 5-vinyl-2-norbornene (VNB), or 5-ethylidene-2-norbonene (ENB). Even more preferably, the EPDM comprises 0.5-15.0 wt %, preferably 2.0-8.0 wt %, more preferably 4.0-6.0 wt %, of polymeric units derived from a diene monomer, wherein the diene monomer is 5-ethylidene-2-norbonene (ENB).

In a further particular embodiment, the EPDM comprises:
40.0-80.0 wt % of polymeric units derived from ethylene;
20.0-50.0 wt % of polymeric units derived from propylene; and
0.5-15.0 wt % of polymeric units derived from a diene monomer.

In another particular embodiment, the EPDM comprises:
40.0-80.0 wt % of polymeric units derived from ethylene;
20.0-50.0 wt % of polymeric units derived from propylene; and 0.5-10.0 wt % of polymeric units derived from a diene monomer, wherein the diene monomer is dicyclopentadiene (DCPD), 5-vinyl-2-norbornene (VNB), or 5-ethylidene-2-norbonene (ENB).

It is particularly preferred that the EPDM comprises:
40.0-80.0 wt % of polymeric units derived from ethylene;
20.0-50.0 wt % of polymeric units derived from propylene; and
0.5-10.0 wt % of polymeric units derived from a diene monomer, wherein the diene monomer is 5-ethylidene-2-norbonene (ENB).

Even more particularly is it preferred that the EPDM comprises:
55.0-64.5 wt % of polymeric units derived from ethylene;
35.0-44.5 wt % of polymeric units derived from propylene; and
0.5-10.0 wt % of polymeric units derived from a diene monomer, wherein the diene monomer is 5-ethylidene-2-norbonene (ENB).

The wt % of each of the polymeric units derived from ethylene, propylene and diene monomer is to be understood as the wt % of the polymeric units derived from that monomer with regard to the total weight of the polymeric units derived from ethylene, propylene and diene in the EPDM.

The content of polymeric units derived from ENB and/or DCPD in the EPDM may be determined in accordance with ASTM D6047 (99).

The content of polymeric units derived from ethylene and/or propylene in the EPDM may be determined in accordance with ASTM D3900 (2015).

In a particular embodiment, the EPDM comprises:
40.0-80.0 wt % of polymeric units derived from ethylene, as determined in accordance with ASTM D3900(2015);
20.0-50.0 wt % of polymeric units derived from propylene, as determined in accordance with ASTM D3900 (2015); and
0.5-10.0 wt % of polymeric units derived from a diene monomer, wherein the diene monomer is 5-ethylidene-2-norbonene (ENB), as determined in accordance with ASTM D6047 (99).

The EPDM may for example have a Mooney viscosity ML(1+4) of 20-100 MU, preferably 50-100 MU, more preferably 75-90 MU.

The Mooney viscosity may be determined in accordance with ASTM D1646 (2007) at 125° C.

The EPDM may for example have a polydispersity index $M_w/M_n$ of ≥2.8 and ≤3.5, preferably ≥3.0 and ≤3.3. The EPDM may for example have a weight average molecular weight $M_w$ of ≥150.000 and ≤300.000 g/mol, preferably ≥175.000 and ≤250.000 g/mol, more preferably ≥200.000 and ≤220.000 g/mol. The EPDM may have a number average molecular weight of ≥50.000 and ≤150.000 g/mol, preferably ≥60.000 and ≤100.000 g/mol, more preferably ≥70.000 and ≤80.000 g/mol. The EPDM may have a z-average molecular weight of ≥400.000 and ≤700.000 g/mol, preferably ≥450.000 and ≤500.000 g/mol.

The ethylene copolymer may for example have a polydispersity index $M_w/M_n$ of ≤1.5 and ≥4.0, preferably ≥2.0 and ≤3.0. The ethylene copolymer may for example have a weight average molecular weight $M_w$ of ≥50.000 and ≤200.000 g/mol, preferably ≥100.000 and ≤150.000 g/mol. The ethylene copolymer may for example have a number average molecular weight $M_n$ of ≥25.000 and ≤100.000, preferably ≥30.000 and ≤60.000 g/mol. The ethylene copolymer may for example have a z-average molecular weight of ≥150.000 and ≤400.000 g/mol, preferably ≥150.000 and ≤300.000 g/mol.

The number average molecular weight $M_n$, the weight average molecular weight $M_w$ and the z-average molecular weight $M_z$ of the EPDM, the ethylene copolymer and the propylene copolymer may be determined in accordance with ISO 16014-1 (2012). For determination of the molecular weight characteristics of the ethylene copolymer and the propylene copolymer, the GPC analysis was performed at 120° C. using 1,2,4-trichlorobenzene as eluent and butylhydroxytoluene as stabiliser, wherein calculations were performed using the narrow polystyrene standard of ISO 16014-1 (2012). For determination of the molecular weight characteristics of the EPDM, the GCP analysis was performed at 160° C. using 1,2,4-trichlorobenzene as eluent and butylhydroxytoluene as stabiliser, wherein calculations were performed using the narrow polystyrene standard of ISO 16014-1 (2012).

The ethylene copolymer may for example have a melt mass flow rate of 0.1-20.0 g/10 min, preferably 0.5-10.0 g/10 min, more preferably 0.5-3.0 g/10 min, as determined at 190° C. under a load of 2.16 kg. The melt mass flow rate may for example be determined in accordance with ASTM D1238 (2013).

The ethylene copolymer may for example have a density of >850 and <910 kg/m$^3$. Preferably, the ethylene copolymer has a density of >850 and <880 kg/m$^3$, more preferably >855 and <870 kg/m$^3$. The density may for example be determined in accordance with ASTM D1505 (2010).

The ethylene copolymer may for example comprise ≥60.0 and ≤95.0 wt % of polymeric units derived from ethylene, with regard to the total weight of the ethylene copolymer. Preferably, the ethylene copolymer comprises ≥60.0 and ≤75.0 wt % of polymeric units derived from ethylene.

The ethylene copolymer may for example comprise ≥5.0 and ≤40.0 wt % of polymeric units derived from a comonomer, with regard to the total weight of the ethylene copolymer. Preferably, the ethylene copolymer comprises ≥10.0 and ≤35.0 wt % of polymeric units derived from a comonomer, more preferably ≥25.0 and ≤35.0 wt %. The comonomer may for example be a mono-olefinic compound comprising 3 to 10 carbon atoms. Preferably, the comonomer is selected from propylene, 1-butene, 4-methyl-1-pentene, 1-hexene or 1-octene. For example, the comonomer may be 1-octene.

The ethylene copolymer may for example comprise ≥10.0 and ≤35.0 wt % of polymeric units derived from a comonomer, wherein the comonomer is selected from propylene, 1-butene, 4-methyl-1-pentene, 1-hexene or 1-octene. Preferably, ethylene copolymer may for example comprise ≥10.0 and ≤35.0 wt % of polymeric units derived from a comonomer, wherein the comonomer is 1-octene. In a further embodiment, the ethylene copolymer may for example comprise ≥25.0 and ≤35.0 wt % of polymeric units derived from a comonomer, wherein the comonomer is selected from propylene, 1-butene, 4-methyl-1-pentene, 1-hexene or 1-octene. Preferably, ethylene copolymer may for example comprise ≥25.0 and ≤35.0 wt % of polymeric units derived from a comonomer, wherein the comonomer is 1-octene.

The ethylene copolymer preferably consists of polymeric units derived from ethylene and polymeric units derived from a comonomer, wherein the comonomer is selected from propylene, 1-butene, 4-methyl-1-pentene, 1-hexene or 1-octene. The ethylene copolymer more preferably consists of polymeric units derived from ethylene and ≥10.0 and ≤35.0 wt % polymeric units derived from a comonomer, with regard to the weight of the ethylene copolymer, wherein the comonomer is selected from propylene, 1-butene, 4-methyl-1-pentene, 1-hexene or 1-octene.

The comonomer content of the ethylene copolymer may for example be determined via $^{13}C$ NMR spectrometry according to the method presented in JAPS, Vol. 42, pp. 399-408, 1991.

The first and the second peroxide may for example be the same compound. Alternatively, the first and the second peroxide may each be different compounds. Each of the first and the second peroxide may for example be individually selected from benzoyl peroxide, dicumyl peroxide, 2,5-dimethyl-2,5-di(tert-butylperoxy)hexane, and di(tert-butylperoxyisopropyl)benzene.

The total weight of the first peroxide and the second peroxide may for example be ≥0.01 wt % and ≤1.00 wt % with regard to the total weight of the first composition and the second composition. Preferably, the total weight of the first peroxide and the second peroxide is ≥0.05 wt % and ≤0.50 wt % with regard to the total weight of the first composition and the second composition. More preferably, the total weight of the first peroxide and the second peroxide is ≥0.10 wt % and ≤0.40 wt % with regard to the total weight of the first composition and the second composition. Even more preferably, the total weight of the first peroxide and the second peroxide is ≥0.10 wt % and ≤0.40 wt % with regard to the total weight of the first composition and the second composition, and each of the first and the second peroxide is selected from benzoyl peroxide, dicumyl peroxide, 2,5-dimethyl-2,5-di(tert-butylperoxy)hexane, and di(tert-butylperoxyisopropyl)benzene. Yet even more preferably, the total weight of the first peroxide and the second peroxide is ≥0.10 wt % and ≤0.40 wt % with regard to the total weight of the first composition and the second composition, and each of the first and the second peroxide is dicumyl peroxide.

For example, the first peroxide may be supplied in a quantity of ≥0.01 wt % and ≤0.50 wt % and the second peroxide may be supplied in a quantity of ≥0.01 wt % and ≤0.50 wt %, both with regard to the total weight of the first composition and the second composition. Preferably, the first peroxide is supplied in a quantity of ≥0.05 wt % and ≤0.30 wt % and the second peroxide is supplied in a quantity of ≥0.05 wt % and ≤0.30 wt %, both with regard to the total weight of the first composition and the second composition. More preferably, the first peroxide is supplied in a quantity of ≥0.05 wt % and ≤0.30 wt % and the second peroxide is supplied in a quantity of ≥0.05 wt % and ≤0.30 wt %, both with regard to the total weight of the first composition and the second composition, and each of the first and the second peroxide is selected from benzoyl peroxide, dicumyl peroxide, 2,5-dimethyl-2,5-di(tert-butylperoxy)hexane, and di(tert-butylperoxyisopropyl)benzene. Yet even more preferably, the first peroxide is supplied in a quantity of ≥0.05 wt % and ≤0.30 wt % and the second peroxide is supplied in a quantity of ≥0.05 wt % and ≤0.30 wt %, both with regard to the total weight of the first composition and the second composition, and each of the first and the second peroxide is dicumyl peroxide.

The propylene copolymer may for example have a melt mass flow rate of 0.1-20.0 g/10 min, preferably 0.5-10.0 g/10 min, more preferably 0.5-3.0 g/10 min, as determined at 230° C. under a load of 2.16 kg. The melt mass flow rate may for example be determined in accordance with ASTM D1238 (2013).

The propylene copolymer may for example comprise ≥60.0 and ≤95.0 wt % of polymeric units derived from propylene, with regard to the total weight of the propylene copolymer. Preferably, the propylene copolymer comprises ≥60.0 and ≤75.0 wt % of polymeric units derived from propylene.

The propylene copolymer may for example comprise ≥5.0 and ≤40.0 wt % of polymeric units derived from a comonomer, with regard to the total weight of the propylene copolymer. Preferably, the propylene copolymer comprises ≥10.0 and ≤35.0 wt % of polymeric units derived from a comonomer, more preferably ≥25.0 and ≤35.0 wt %. The comonomer may for example be a mono-olefinic compound comprising 2 carbon atoms or 4 to 10 carbon atoms. Preferably, the comonomer is selected from ethylene, 1-butene, 4-methyl-1-pentene, 1-hexene or 1-octene. For example, the comonomer may be ethylene.

The propylene copolymer may for example comprise ≥10.0 and ≤35.0 wt % of polymeric units derived from a comonomer, wherein the comonomer is selected from ethylene, 1-butene, 4-methyl-1-pentene, 1-hexene or 1-octene. Preferably, propylene copolymer may for example comprise ≥10.0 and ≤35.0 wt % of polymeric units derived from a comonomer, wherein the comonomer is ethylene. In a further embodiment, the propylene copolymer may for example comprise ≥25.0 and ≤35.0 wt % of polymeric units derived from a comonomer, wherein the comonomer is selected from ethylene, 1-butene, 4-methyl-1-pentene, 1-hexene or 1-octene. Preferably, propylene copolymer may for example comprise ≥25.0 and ≤35.0 wt % of polymeric units derived from a comonomer, wherein the comonomer is ethylene.

The propylene copolymer preferably consists of polymeric units derived from propylene and polymeric units derived from a comonomer, wherein the comonomer is selected from ethylene, 1-butene, 4-methyl-1-pentene, 1-hexene or 1-octene. The propylene copolymer more preferably consists of polymeric units derived from ethylene and ≥5.0 and ≤40.0 wt % polymeric units derived from a comonomer, with regard to the weight of the propylene copolymer, wherein the comonomer is selected from ethylene, 1-butene, 4-methyl-1-pentene, 1-hexene or 1-octene.

The comonomer content of the propylene copolymer may for example be determined via $^{13}C$ NMR spectrometry according to the method presented in JAPS, Vol. 42, pp. 399-408, 1991.

In a particular embodiment, the invention relates to a process for the production of an ethylene-propylene-diene terpolymer (EPDM) composition in a reaction vessel comprising the following steps in this order:

(a) supplying a quantity of a first composition comprising an ethylene copolymer or a propylene copolymer and a first peroxide to the reaction vessel;

(b) supplying a quantity of a second composition comprising EPDM and a second peroxide to the reaction vessel;

or (a) supplying a quantity of a second composition comprising EPDM and a second peroxide to the reaction vessel;

(b) supplying a quantity of a first composition comprising an ethylene copolymer or a propylene copolymer and a first peroxide to the reaction vessel;

and (c) exposing the contents of the reaction vessel under stirring to a temperature of 125-175° C. for a period of 5-30 minutes;

wherein the ethylene copolymer is a copolymer comprising, preferably consisting of, polymeric units derived from ethylene and ≥10.0 and ≤35.0 wt % of polymeric units derived from a mono-olefinic compound comprising 3 to 10 carbon atoms selected from propylene, 1-butene, 4-methyl-1-pentene, 1-hexene or 1-octene, preferably 1-octene;

wherein the propylene copolymer is a copolymer comprising, preferably consisting of, polymeric units derived from propylene and polymeric units derived from a mono-olefinic compound comprising 2 carbon atoms or 4-10 carbon atoms; and wherein the EPDM comprises:

40.0-80.0 wt % of polymeric units derived from ethylene, as determined in accordance with ASTM D3900(2015);

20.0-50.0 wt % of polymeric units derived from propylene, as determined in accordance with ASTM D3900 (2015); and 0.5-10.0 wt % of polymeric units derived from a diene monomer, wherein the diene monomer is 5-ethylidene-2-norbonene (ENB), as determined in accordance with ASTM D6047 (99).

In a further particular embodiment, the invention relates to a process for the production of an ethylene-propylene-diene terpolymer (EPDM) composition in a reaction vessel comprising the following steps in this order:

(a) supplying a quantity of a first composition comprising an ethylene copolymer or a propylene copolymer and a first peroxide to the reaction vessel;

(b) supplying a quantity of a second composition comprising EPDM and a second peroxide to the reaction vessel;

or (a) supplying a quantity of a second composition comprising EPDM and a second peroxide to the reaction vessel;

(b) supplying a quantity of a first composition comprising an ethylene copolymer or a propylene copolymer and a first peroxide to the reaction vessel;

and (c) exposing the contents of the reaction vessel under stirring to a temperature of 125-175° C. for a period of 5-30 minutes;

wherein the ethylene copolymer is a copolymer comprising polymeric units derived from ethylene and ≥10.0 and ≤35.0 wt % of polymeric units derived from a mono-olefinic compound comprising 3 to 10 carbon atoms selected from propylene, 1-butene, 4-methyl-1-pentene, 1-hexene or 1-octene, preferably 1-octene, having a density of >850 and <880 kg/m3 as determined in accordance with ASTM D1505 (2010);

wherein the propylene copolymer is a copolymer comprising polymeric units derived from propylene and polymeric units derived from a mono-olefinic compound comprising 2 carbon atoms or 4-10 carbon atoms; and wherein the EPDM comprises:

40.0-80.0 wt % of polymeric units derived from ethylene, as determined in accordance with ASTM D3900(2015);

20.0-50.0 wt % of polymeric units derived from propylene, as determined in accordance with ASTM D3900 (2015); and 0.5-10.0 wt % of polymeric units derived from a diene monomer, wherein the diene monomer is 5-ethylidene-2-norbonene (ENB), as determined in accordance with ASTM D6047 (99).

In a yet further particular embodiment, the invention relates to a process for the production of an ethylene-propylene-diene terpolymer (EPDM) composition in a reaction vessel comprising the following steps in this order:

(a) supplying a quantity of a first composition comprising an ethylene copolymer or a propylene copolymer and a first peroxide to the reaction vessel;

(b) supplying a quantity of a second composition comprising EPDM and a second peroxide to the reaction vessel;

or (a) supplying a quantity of a second composition comprising EPDM and a second peroxide to the reaction vessel;

(b) supplying a quantity of a first composition comprising an ethylene copolymer or a propylene copolymer and a first peroxide to the reaction vessel;

and (c) exposing the contents of the reaction vessel under stirring to a temperature of 125-175° C. for a period of 5-30 minutes;

wherein the ethylene copolymer is a copolymer comprising polymeric units derived from ethylene and ≥10.0 and ≤35.0 wt % of polymeric units derived from a mono-olefinic compound comprising 3 to 10 carbon atoms selected from propylene, 1-butene, 4-methyl-1-pentene, 1-hexene or 1-octene, preferably 1-octene, having a density of >850 and <880 kg/m3 as determined in accordance with ASTM D1505 (2010);

wherein the propylene copolymer is a copolymer comprising polymeric units derived from propylene and polymeric units derived from a mono-olefinic compound comprising 2 carbon atoms or 4-10 carbon atoms;

wherein the EPDM comprises:

40.0-80.0 wt % of polymeric units derived from ethylene, as determined in accordance with ASTM D3900(2015);

20.0-50.0 wt % of polymeric units derived from propylene, as determined in accordance with ASTM D3900 (2015); and 0.5-10.0 wt % of polymeric units derived from a diene monomer, wherein the diene monomer is 5-ethylidene-2-norbonene (ENB), as determined in accordance with ASTM D6047 (99); and wherein the first composition is supplied in a quantity of 5-20 wt % with regard to the total weight of the first composition and the second composition.

In further embodiments, the present invention also relates to compositions comprising the EPDM composition obtained via the inventive process. In particular, the invention relates to compositions comprising the EPDM composition obtained via the inventive process and 5.0-50.0 wt % of paraffinic oil, with regard to the total weight of the composition.

In a certain embodiment of the invention, it is preferred that:

the ethylene copolymer is a copolymer consisting of polymeric units derived from ethylene and ≥10.0 and ≤35.0 wt % of polymeric units derived from a mono-olefinic compound comprising 3 to 10 carbon atoms selected from propylene, 1-butene, 4-methyl-1-pentene, 1-hexene or 1-octene, preferably 1-octene, with regard to the total weight of the ethylene copolymer; and/or the propylene copolymer is a copolymer consisting of, polymeric units derived from propylene and ≥5.0 and ≤40.0 wt % polymeric units derived from a mono-olefinic compound comprising 2 carbon atoms or 4-10 carbon atoms, with regard to the total weigh of the propylene copolymer.

The invention will now be illustrated by the following non-limiting examples.

A number of EPDM compositions were prepared using the following starting materials:

| | |
|---|---|
| EPDM | SABIC EPDM 855 (ethylene-propylene-diene terpolymer) |
| POE | SABIC POE C1070D (ethylene-octene copolymer), density 868 kg/m$^3$ |
| DCP | Composition comprising 40 wt % dicumyl peroxide, CAS reg. nr. 80-43-3, Sigma Aldrich |
| OIL | Sunpar 2280, mixture of paraffinic refined mineral oils of CAS reg. nr. 64742-62-7 and 64742-65-0, Petronas Lubricants |

The compositions were prepared in a Haake internal mixer at a temperature of between 150 and 200° C., and for a duration of 10 minutes.

A number of comparative compositions were prepared by a bulk-feeding regime, in which all ingredients were fed together to the mixer and subjected to mixing. These compositions are provided for comparative purposes.

A further number of compositions was prepared by a split-feeding regime, wherein first a first formulation of ingredients was introduced, which was subjected to mixing conditions until the mixture was molten, following which a second formulation of ingredients was added. The total formulation was further melt mixed to obtain a mixed composition. Compositions were prepared using various conditions. Compositions 10-16, 18 and 20 represent the present invention, compositions 17 and 19 are comparative compositions that were prepared at a higher temperature to demonstrate the temperature range of the process of the present invention.

A further number of oil-extended compositions was prepared according to the above split-feed regime where after obtaining the mixed composition a quantity of the oil was added gradually during 1 minute and further mixed with the composition for 1 minute to obtain an oil-extended composition. These compositions were prepared to demonstrate the effect of the invention to provide oil-extended compositions having improved processability properties.

Compositions were prepared according to formulations and feeding regimes as indicated in the following table. All material quantities are presented in parts by weight.

| | Compositions by bulk-feeding | | | |
|---|---|---|---|---|
| | Processing temperature | Formulation | | |
| Composition | (° C.) | EPDM | POE | DCP |
| 1 | 200 | 100 | 0 | 0 |
| 2 | 200 | 100 | 0 | 1.0 |
| 3 | 200 | 100 | 0 | 0.5 |
| 4 | 200 | 0 | 100 | 0 |
| 5 | 200 | 0 | 100 | 1.0 |
| 6 | 200 | 0 | 100 | 0.5 |
| 7 | 200 | 90 | 10 | |
| 8 | 200 | 90 | 10 | 1.0 |
| 9 | 200 | 90 | 10 | 0.5 |

| | Compositions by split-feeding | | | | | | |
|---|---|---|---|---|---|---|---|
| | Processing temperature | First formulation | | | Second formulation | | |
| Composition | (° C.) | EPDM | POE | DCP | EPDM | POE | DCP |
| 10 | 200 | 0 | 10 | 0.25 | 90 | 0 | 0.25 |
| 11 | 200 | 0 | 10 | 0.50 | 90 | 0 | 0.25 |
| 12 | 200 | 0 | 10 | 0.35 | 90 | 0 | 0.25 |
| 13 | 200 | 0 | 10 | 0.10 | 90 | 0 | 0.25 |
| 14 | 150 | 0 | 10 | 0.25 | 90 | 0 | 0.25 |
| 15 | 175 | 0 | 10 | 0.25 | 90 | 0 | 0.25 |
| 16 | 200 | 0 | 10 | 0.25 | 90 | 0 | 0.50 |
| 17 | 225 | 0 | 10 | 0.25 | 90 | 0 | 0.25 |
| 18 | 150 | 0 | 10 | 0.40 | 90 | 0 | 0.10 |
| 19 | 225 | 0 | 10 | 0.40 | 90 | 0 | 0.10 |
| 20 | 200 | 90 | 0 | 0.25 | 0 | 10 | 0.25 |

| | Oil-extended compositions | | | | | | | |
|---|---|---|---|---|---|---|---|---|
| | Processing temperature | First formulation | | | Second formulation | | | |
| Composition | (° C.) | EPDM | POE | DCP | EPDM | POE | DCP | OIL |
| 21 | 150 | 0 | 10 | 0.25 | 90 | 0 | 0.25 | 10 |
| 22 | 150 | 0 | 10 | 0.25 | 90 | 0 | 0.25 | 20 |
| 23 | 150 | 0 | 10 | 0.25 | 90 | 0 | 0.25 | 30 |

Using material according to the formulations prepared as described above, analysis were performed to obtain insight in the material properties.

The Mooney viscosity ML(1+4) in Mooney units (MU) at 125° C. was determined according to ASTM D1646. Analysis was performed using an Alpha Technologies Mooney Viscometer MV2000 at shear rate of 2 s$^{-1}$, where the sample was pre-heated for 1 minute before starting the motor, and where the torque was recorded for 4 minutes.

A certain high Mooney viscosity is required to enable sufficient carbon black incorporation into the EPDM compositions of the present invention whilst maintaining a required level of processability of the EPDM composition with carbon black.

The ENB %, i.e, the fraction of moieties derived from ENB and having a remaining unsaturation, was determined according to the method described in Kolbert et al., JAPS vol. 71, pp. 523-530, 1999, using $^1$H NMR spectra obtained using an Agilent 600 MHz NMR spectrometer with a 5 mm OneNMR probe at a temperature of 28° C. A 10% solution of the sample of the composition to be analysed in orthodichlorobenzene was prepared at 90° C. for determination of the NMR spectrum, wherein 0.3 ml of the sample solution and 0.3 ml of deuterated orthodichlorobenzene were mixed in the NMR tube prior to performing the analysis. The $^1$H NMR spectrum was collected using a 12 ppm spectral window, with 128 scans averaged with a recycle delay of 5 sec and using a 4.15 µs π/4 pulse. The NMR data were processed with NetNMR software.

A certain high ENB % is required for ensuring sufficient cross-linking to occur during the vulcanisation of the final product that is to be produced using the compositions of the present invention.

The gel content was determined using Soxhlet extraction of samples using hot hexane. Sheets of sample compositions were cut into small pieces for extraction. About 0.5 g sample was placed in a cellulose filter paper pouch, sealed and positioned inside the Soxhlet extractor. The pouches were soaked with about 150 ml of hexane during 18 hrs. Distillation at 70° C. was performed for 8 hrs, after which the pouches containing the non-extracted parts of the sample were taken out and subjected to drying in an air circulation oven at 90° C. for 2 hrs. The gel content was determined as the weight fraction of the sample removed by the extraction.

A high gel content in undesirable as such may bring about defects in the object that is to be produced using the composition of the invention. It is desired that the gel content is ≤25%.

The branching index and loss factor tan δ were determined by rheological characterisation of the samples using a TA Instruments rotorless rotational shear rheometer RPA Flex. Characterisation was performed in accordance with ASTM D5289 (2012). About 5 g of a sample was placed between two thin, clear plastic sheets and pressed between the plates of the RPA instrument at 125° C. Frequency sweep experiments were performed on the samples from 0.033 to 33.333 Hz and at constant strain of 14%. The storage modulus G', loss modulus G", complex modulus G*, complex viscosity η* and loss factor tan δ were measured. The branching index was determined as the slope of the plot of Log(frequency) vs. Log(1/tan δ).

A low branching index and a low tan δ indicate a high degree of branching in the compositions, which is considered beneficial for the incorporation of oil and carbon black.

| Composition | ML(1 + 4) at 125° C. (MU) | Branching index | tan δ (°) | ENB % | Gel content (%) |
|---|---|---|---|---|---|
| 1 | 75.9 | 0.148 | 41.7 | 5.2 | 0 |
| 2 | 104.7 | 0.074 | 27.2 | 3.4 | 17 |
| 3 | 150.1 | 0.037 | 24.4 | 3.7 | |
| 4 | 21.1 | 0.272 | 71.3 | | 0 |

-continued

| Composition | ML(1 + 4) at 125° C. (MU) | Branching index | tan δ (°) | ENB % | Gel content (%) |
|---|---|---|---|---|---|
| 5 | 41.2 | 0.099 | 39.3 | | 14 |
| 6 | 40.2 | 0.073 | 35.3 | | |
| 7 | 59.0 | 0.149 | 43.8 | | |
| 8 | 94.9 | 0.086 | 29.4 | | |
| 9 | 105.5 | 0.086 | 29.1 | 4.6 | 21 |
| 10 | 131.1 | 0.040 | 22.2 | | 20 |
| 11 | 133.2 | 0.077 | 26.4 | | |
| 12 | 122.5 | 0.063 | 25.4 | | |
| 13 | 120.0 | 0.063 | 25.4 | | |
| 14 | 122.1 | 0.080 | 28 | 4.6 | 11 |
| 15 | 138.0 | 0.060 | 23.8 | | 22 |
| 16 | 129.8 | 0.062 | 24.3 | 4.5 | 28 |
| 17 | 82.2 | 0.050 | 23.5 | | |
| 18 | 107.0 | 0.078 | 27.8 | | |
| 19 | 73.0 | 0.105 | 34.9 | | |
| 20 | 124.6 | 0.050 | 28.0 | | |
| 21 | 72.3 | 0.115 | 36.1 | | |
| 22 | 50.6 | 0.139 | 41.8 | | |
| 23 | 42.2 | 0.150 | 44.2 | | |

The above results demonstrate that the process according to the invention, as exemplified by compositions 10-16, 18 and 20, lead to compositions having a high Mooney viscosity, as well as in a desired degree of branching, whilst retaining a sufficiently low gel content and sufficiently high ENB content.

The invention claimed is:

1. A process for the production of an ethylene-propylene-diene terpolymer (EPDM) composition in a reaction vessel comprising the following steps in this order:
    (a) supplying a quantity of a first composition comprising an ethylene copolymer or a propylene copolymer and a first peroxide to the reaction vessel;
    (b) supplying a quantity of a second composition comprising EPDM and a second peroxide to the reaction vessel;
    or
    (a) supplying a quantity of a second composition comprising EPDM and a second peroxide to the reaction vessel;
    (b) supplying a quantity of a first composition comprising an ethylene copolymer or a propylene copolymer and a first peroxide to the reaction vessel;
    and
    (c) exposing the contents of the reaction vessel under stirring to a temperature of 100-200° C.;
    wherein the ethylene copolymer is a copolymer comprising polymeric units derived from ethylene and polymeric units derived from a mono-olefinic compound comprising 3 to 10 carbon atoms, and wherein the propylene copolymer is a copolymer comprising polymeric units derived from propylene and polymeric units derived from a mono-olefinic compound comprising 2 carbon atoms or 4-10 carbon atoms.

2. The process according to claim 1, wherein
    the ethylene copolymer is a copolymer consisting of polymeric units derived from ethylene and ≥10.0 and ≤35.0 wt % of polymeric units derived from a mono-olefinic compound comprising 3 to 10 carbon atoms selected from propylene, 1-butene, 4-methyl-1-pentene, 1-hexene or 1-octene, with regard to the total weight of the ethylene copolymer; and/or
    the propylene copolymer is a copolymer consisting of, polymeric units derived from propylene and ≥5.0 and ≤40.0 wt % polymeric units derived from a mono-olefinic compound comprising 2 carbon atoms or 4-10 carbon atoms, with regard to the total weigh of the propylene copolymer.

3. The process according to claim 1, wherein the contents of the reaction vessel in step (c) are exposed to a temperature of 100-200° C. for >5 min.

4. The process according to claim 1, wherein the first composition is supplied in a quantity of 5-20 wt % with regard to the total weight of the first composition and the second composition.

5. A process for the production of an ethylene-propylene-diene terpolymer (EPDM) composition in a reaction vessel comprising the following steps in this order:
(a) supplying a quantity of a first composition comprising an ethylene copolymer and a first peroxide to the reaction vessel and heating the contents of the reaction vessel to above the melting temperature of the ethylene copolymer;
(b) supplying a quantity of a second composition comprising EPDM and a second peroxide to a reaction vessel;
and
(c) exposing the contents of the reaction vessel to a temperature of 100-200° C.

6. A process for the production of an ethylene-propylene-diene terpolymer (EPDM) composition in a reaction vessel comprising the following steps in this order:
(a) supplying a quantity of a first composition comprising an ethylene copolymer and a first peroxide to the reaction vessel and heating the contents of the reaction vessel to a temperature of >60° C.;
(b) supplying a quantity of a second composition comprising EPDM and a second peroxide to a reaction vessel;
and
(c) exposing the contents of the reaction vessel to a temperature of 100-200° C.

7. The process according to claim 1, wherein the ethylene copolymer comprises ≥5.0 and ≤40.0 wt % of polymeric units derived from the mono-olefinic compound comprising 3 to 10 carbon atoms with regard to the total weight of the ethylene copolymer.

8. The process according to claim 1, wherein the mono-olefinic compound comprising 3 to 10 carbon atoms is selected from propylene, 1-butene, 4-methyl-1-pentene, 1-hexene or 1-octene.

9. The process according to claim 1, wherein the ethylene copolymer has a density as determined according to ASTM D1505 (2010) of >850 and <910 kg/m³.

10. The process according to claim 1, wherein the first peroxide and the second peroxide are each individually selected from benzoyl peroxide, dicumyl peroxide, 2,5-dimethyl-2,5-di(tert-butylperoxy)hexane, and di(tert-butylperoxyisopropyl)benzene.

11. The process according to claim 1, wherein the total weight of the first peroxide and the second peroxide is ≥0.01 wt % and ≤1.00 wt % with regard to the total weight of the first composition and the second composition.

12. The process according to claim 1, wherein the first peroxide is supplied in a quantity of ≥0.01 wt % and ≤0.50 wt % and the second peroxide is supplied in a quantity of ≥0.01 wt % and ≤0.50 wt %, both with regard to the total weight of the first composition and the second composition.

13. The process according to claim 1, wherein the pressure in the reaction vessel during the process is atmospheric pressure.

14. A composition comprising the EPDM composition obtained via the process of claim 1.

15. The composition according to claim 14 further comprising 5.0-50.0 wt % of paraffinic oil with regard to the total weight of the composition.

16. Process according to claim 6, wherein the ethylene copolymer is not an EPDM and the propylene copolymer is not an EPDM.

17. Process according to claim 1, wherein the process involves a step (a2) between step (a) and step (b) wherein the contents of the reaction vessel are heated to above the melting temperature.

18. Process according to claim 1, wherein the ethylene copolymer is not an EPDM and the propylene copolymer is not an EPDM.

19. Process according to claim 1,
wherein the ethylene copolymer is a copolymer consisting of polymeric units derived from ethylene and ≥10.0 and ≤35.0 wt % of polymeric units derived from a mono-olefinic compound comprising 3 to 10 carbon atoms selected from propylene, 1-butene, 4-methyl-1-pentene, 1-hexene or 1-octene, preferably 1-octene, with regard to the total weight of the ethylene copolymer; and/or wherein the propylene copolymer is a copolymer consisting of, polymeric units derived from propylene and ≥5.0 and ≤40.0 wt % polymeric units derived from a mono-olefinic compound comprising 2 carbon atoms or 4-10 carbon atoms, with regard to the total weigh of the propylene copolymer;
wherein the contents of the reaction vessel in step (c) are exposed to a temperature of 100-200° C. for >5 min;
wherein the first composition is supplied in a quantity of 5-20 wt % with regard to the total weight of the first composition and the second composition;
wherein the ethylene copolymer has a density as determined according to ASTM D1505 (2010) of >850 and <910 kg/m³;
wherein the first peroxide and the second peroxide are each individually selected from benzoyl peroxide, dicumyl peroxide, 2,5-dimethyl-2,5-di(tert-butylperoxy)hexane, and di(tert-butylperoxyisopropyl)benzene; and
wherein the total weight of the first peroxide and the second peroxide is ≥0.01 wt % and ≤1.00 wt % with regard to the total weight of the first composition and the second composition.

20. The process according to claim 19, wherein the first peroxide is supplied in a quantity of ≥0.01 wt % and ≤0.50 wt % and the second peroxide is supplied in a quantity of ≥0.01 wt % and ≤0.50 wt %, both with regard to the total weight of the first composition and the second composition.

* * * * *